(12) United States Patent
Dietl et al.

(10) Patent No.: US 6,182,081 B1
(45) Date of Patent: Jan. 30, 2001

(54) METHOD FOR PERFORMING IN INTERACTIVE REVIEW OF DATA CONTENTS OF A COMPUTER

(76) Inventors: Bo Dietl, 220 E. 42nd St., N.Y.C., NY (US) 10017; Edward Warman, 35 Harbour Dr., Blue Point, NY (US) 11715; Sajay Balan, #326 Imperial Way, Bayport, NY (US) 11705; Oleg Rybalko, 120-5 Sussex Pl., Bohemia, NY (US) 11716

( * ) Notice: Under 35 U.S.C. 154(b), the term of this patent shall be extended for 0 days.

(21) Appl. No.: 09/213,071

(22) Filed: Dec. 16, 1998

(51) Int. Cl.[7] .................................................. G06F 17/30
(52) U.S. Cl. ........................ 707/102; 709/217; 713/20; 707/9
(58) Field of Search ................................... 707/100, 101, 707/102, 103, 9; 709/217–218; 713/200

(56) References Cited

U.S. PATENT DOCUMENTS 5,619,648 * 4/1997 Canale et al. ..................... 709/206
5,706,507 * 1/1998 Schloss ................................ 707/104
5,737,734 * 4/1998 Schultz ..................................... 707/5
5,835,722 * 11/1998 Bradshaw et al. .................... 709/255

* cited by examiner

Primary Examiner—Hosain T. Alam
Assistant Examiner—Jean Bolte Flelirantin
(74) Attorney, Agent, or Firm—Scully, Scott, Murphy & Presser

(57) ABSTRACT

The present invention protects a computer user from exposure to offensive materials from the Internet or other sources, by allowing a user without any computer knowledge or experience to determine if the computer has been exposed to offensive materials. The present invention does not require any installation and does not leave any recognizable traces of it being executed. It collects all the viewable files and all files having offensive words, based on a pre-compiled list, in them and allows the user to review and delete these files. The files are collected from all directories on the attached computer disks without regard to their access control status, e.g., hidden and files marked deleted are collected as well.

22 Claims, 8 Drawing Sheets

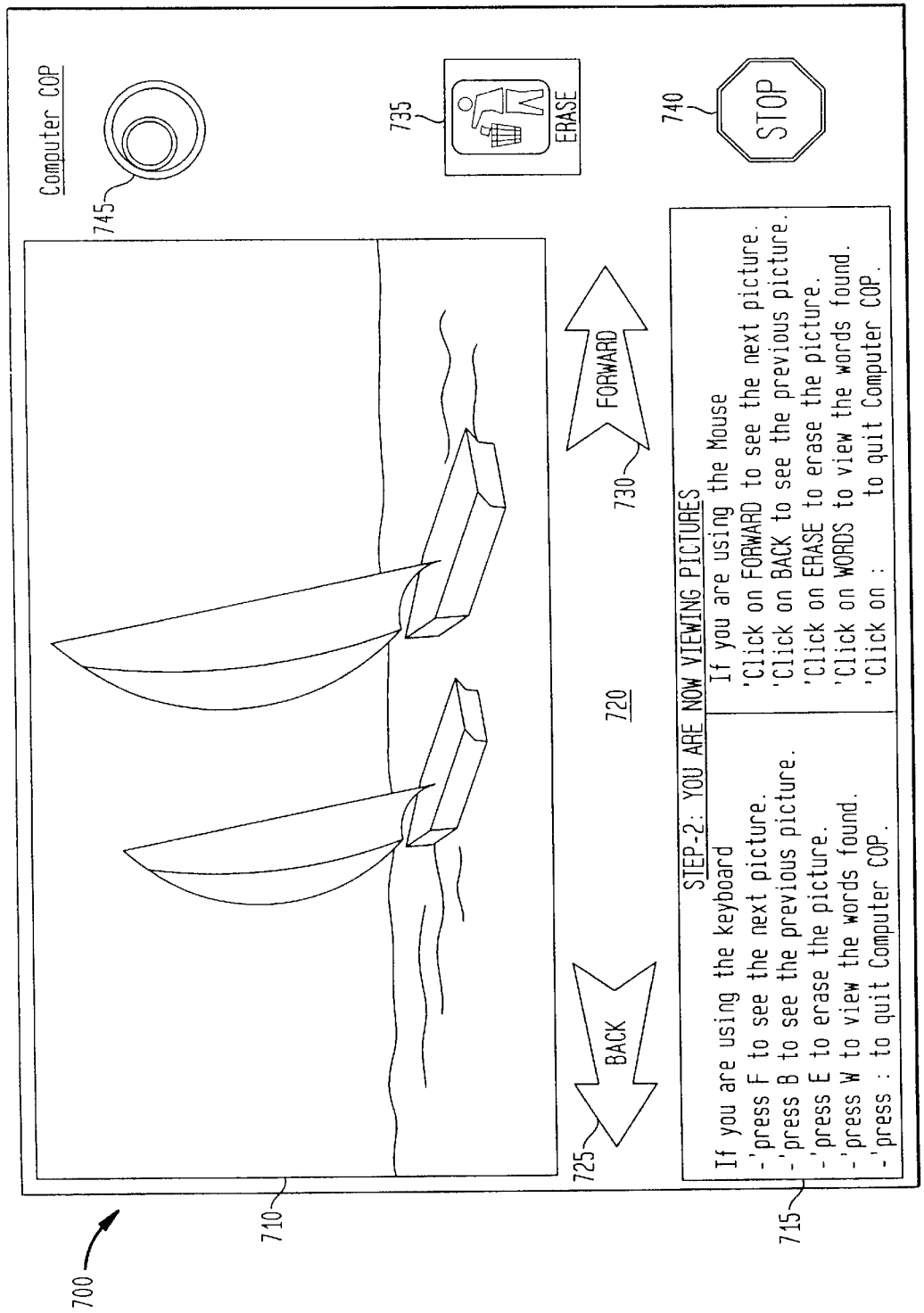

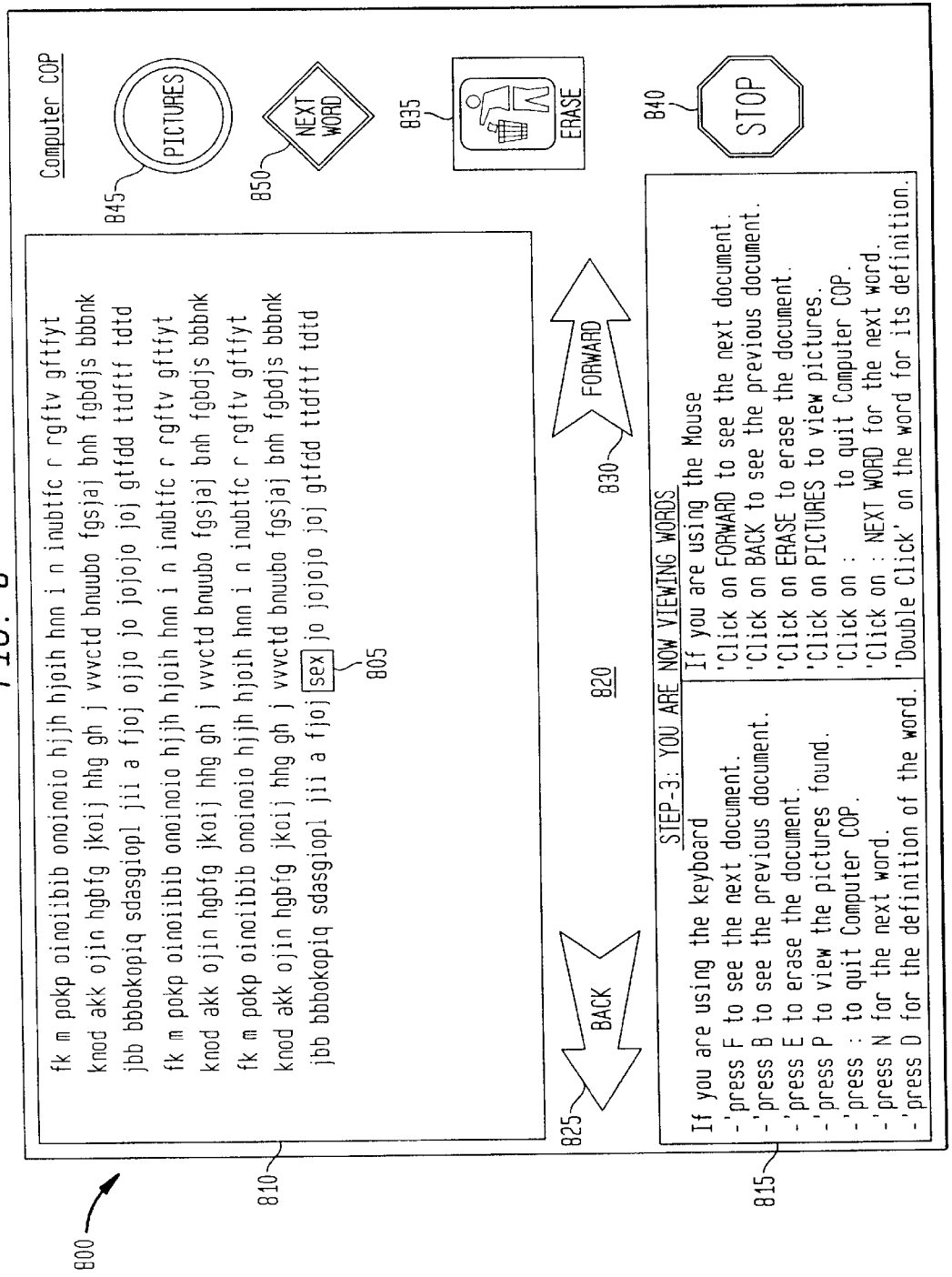

METHOD FOR PERFORMING IN INTERACTIVE REVIEW OF DATA CONTENTS OF A COMPUTER

BACKGROUND OF THE INVENTION

1. Field of the Invention

The present invention is directed to computer program intended to be run on a personal computer. More particularly, the present invention enables a technically unsophisticated user to conduct a sophisticated and substantially undetectable review of all files residing on a computer to determine if a user of the computer has been exposed to or sought offensive materials from the Internet and other sources.

2. Description of Prior Art

The current number of worldwide Internet users is estimated to be in excess of 50 million, with many of those users being children. As of January 1998 more than 45 million households owned a personal computer. While the Internet is an unprecedented avenue for the sharing of ideas and information, there is also a great concern for its inherent threat to corporate and personal security.

The Internet is becoming one more avenue where children are exposed to violence and sex. Today there are many children who use computers and who posses the technical sophistication to use the Internet and connect to the many resources available. Many parents of these children are unable to use a computer and, because of this, are not aware of what, or who, their children may have been exposed to. The Internet is a wonderful place for children as long as they receive guidance and supervision. However, the Internet makes also available many web sites that focus on and graphically depict the depraved side of human nature. The line separating the desired innocent use of the Internet from depravity is very thin. With an inadvertent misspelling of a site name an underage Internet user may be exposed to sites containing:

pornography;

extreme and tasteless sexual images;

violent words and images of violence;

images of drug use and drug promotion;

instructions of criminal skills, such as bomb making;

Internet gambling;

e-mail containing objectionable words/phrases; and more.

First Amendment Violations

Products currently available for Internet user protection, such as X-STOP, Cybersitter, Surf Watch, Cyber Patrol, Net Nanny and Cyber Snoop, block and filter objectionable sites. These products deny a computer user, such as a child or an employee, access to known offensive web sites, but are unable to adjust to the contextual use of a word. Searches for legitimate information are hampered by this drawback. Some of these programs also monitor or log the computer users attempts to access these web sites.

Installation

Yet another inconvenience with known prior art programs is that they must be installed on the hard drive of the computer. A typical installation of new software in a PC environment requires the user to either go to the task bar and then to the control panel and double click on the "Install New Software Icon" or follow the instructions as the CD-ROM starts its own install via the CD Autorun.

The install process, typically, requires:

1. choosing where, i.e., in what directory on the computer, the software is to be installed;
2. whether the user wants to change the name of the program under the program directory;
3. whether the user wants a short-cut icon placed on windows desktop; and
4. after the install process is completed, the user must setup or customize the program.

To install sophisticated programs as these referenced above, a user must be familiar with terms such as IRCs, FTPs, newsgroup, username, directory, and shortcuts. Additionally, the user must decide whether to have complete access, to have access just to a specified list of sites or to use a pre-defined filter list. In each case the user must navigate a series of windows. "Cyber Patrol" for example has eight setup windows, each having dozens of buttons to activate before the program can operate. Typically, the user must update this filter list via the Internet or an update diskette, which must be installed.

There is a need for a method to investigate computer usage on the Internet without blocking or filtering access to Internet locations in order not to violate the First Amendment rights of legitimate intended users. There is also a need for such a program method, in which no computer knowledge is required.

SUMMARY OF THE INVENTION

A parents' concern for children, who may constitute one of the largest groups of Internet users, prompted the development of the present invention, the preferred embodiment of which is a software program designed to let parents investigate their computer.

The present invention is designed for novice computer users, it does not require:

a working knowledge of computers;

the installation of software;

watching a tutorial introduction to the workings of the software;

setting specific controls to conform the software to the hardware requirements; and testing which requires logging to adult Internet sites.

The effectiveness of present invention is not dependent on the proper installation and configuration. It does not require traditional set-up and runs automatically with little user interaction. No installation of the present invention is necessary, it may run directly off a peripheral device connected to the PC, such as a CD-drive. Additionally, the present invention leaves no easily detectable traces that the program was run on the computer.

Modern corporations are propelled into using the Internet. Some of the legitimate uses of the Internet to achieve corporate goals include:

doing business, such as offering products and information for sale and presenting corporate information;

communicating through the use of e-mail; and performing research.

It is a legitimate concern of the management that the employees do not use the corporate computer equipment for purposes unrelated to their jobs. However, limiting the scope of employees' access to the Internet by using blocking software may lower employees' productivity by blocking legitimate sites and preventing legitimate and necessary sites and documents from being located.

It is inefficient in a large business or a corporation utilizing multiple computers to install and configure blocking software on every computer. This is extremely expensive, time consuming and will not alert the management in event an employee has found a way to circumvent the installed software, or has simply deinstalled it.

In the preferred operating system environment, as soon as the user drops the CD-ROM disc into the computer, the inventive method sets up itself and instantly starts scanning the computer for images and text that match a pre-defined criteria. The present invention searches for images, text, i.e., words, and web files. The text and web search compare to a predetermined list of flagged words and phrases.

Each image found on the computer is displayed in a viewing window. As each image is displayed, the user can click a mouse button or depress a keyboard key to delete the image.

The same viewing window displays text that is objectionable or obscene. The text can be deleted with a click of a mouse button, or by depressing a keyboard key.

Once the user finishes viewing these images and text files, the invention ejects the CD-ROM disk for removal from the computer.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 7 is a program interface screen in the image display mode; and

FIG. 8 is a program interface screen in the text display mode.

DETAILED DESCRIPTION OF THE INVENTION

In the preferred embodiment of the present invention, the user turns on the computer, and places the computer readable CD-ROM disk containing the inventive method into the computer CD-ROM drive.

Figure 1:
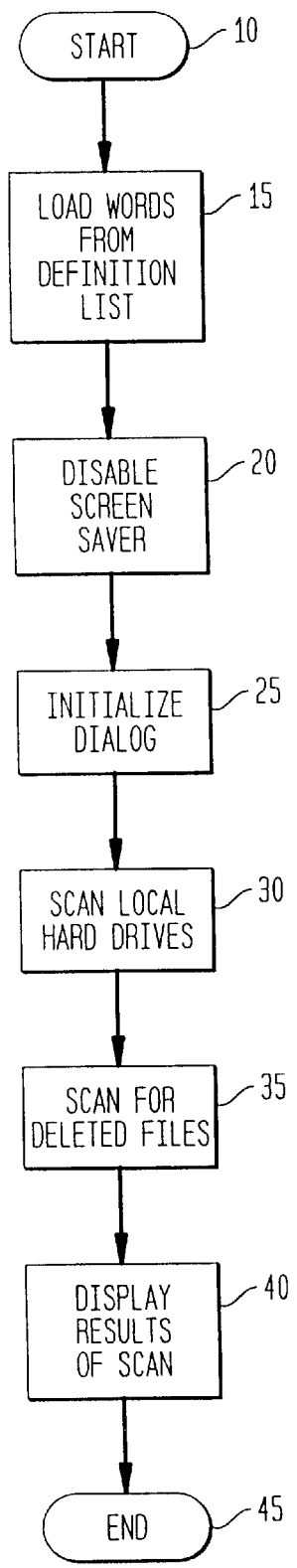
FIG. 1 is an overall flowchart of the inventive method logic.

As shown in FIG. 1, in step 10 the invention is executed by a built in Autorun feature standard on the newer windows PC operating systems. If a username/password dialogue pops up on the computer screen a user may press an escape key instead of entering the information. The invention loads the definition list at step 15 and at step 20 disables the screen saver feature of the operating system. The disabling of the screen saver is done to prevent it from going into a screen saver mode while the system is being reviewed and interfering with the viewing of the dialogue screen 1 shown in FIG. 7. Additionally, if the Autorun feature of the operating system is turned off the program of the present invention may be launched by a user.

Figure 2:
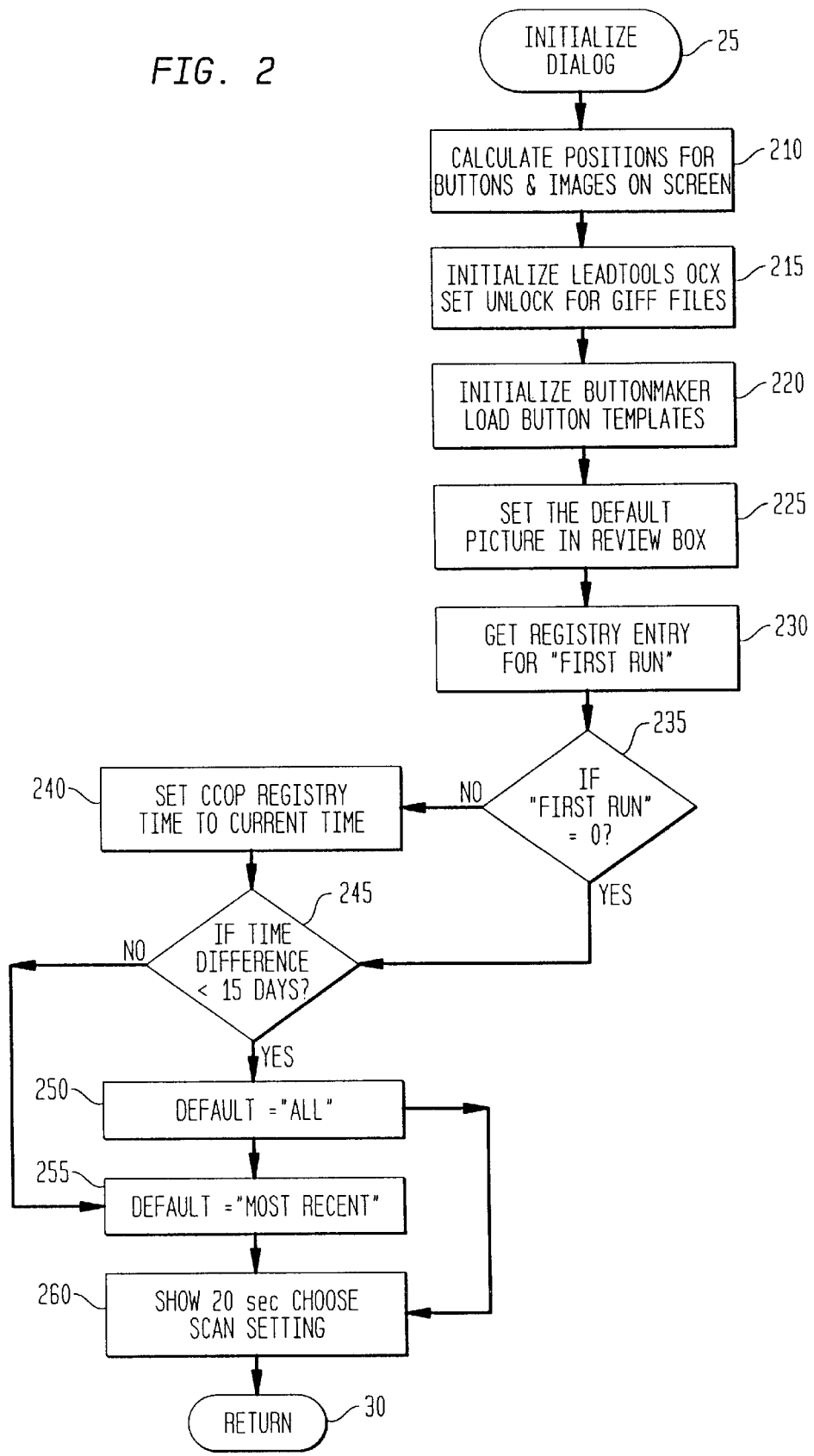
FIG. 2 is a flowchart of the initialize dialogue logic.

FIG. 2 shows a dialogue initialization routine initiated at step 25 (FIG. 1). This routine, at step 210 calculates positions for buttons 2, 3, 4, 6, 7 (FIG. 7) and images 8 (FIG. 7) to be displayed on the computer screen. The program adjusts itself to the screen size and the resolution setting, e.g., 640×480, 1280×1024, of a particular computer. At step 215, lead tools for the online control object (OCX), are initialized and the image files are enabled for display. The OCX displays a variety of image types. The image types which may be displayed by the invention include the following: BMP; PCX; CMX; CDR; JPG; GIF; FIX; TIF; etc.

The button making features of the invention are initialized and the button templates are loaded at step 220. At step 225 a default image is set in review box 8 (FIG. 7) and the "First run" operating system registry entry is secured in step 230. A determination is made at step 235 whether the current run is a "First run". If it is not, at step 240 operating system's registry time for the inventive method is set to current time.

At step 245 a determination is made from the operating system registration file whether the last time the inventive method was executed on the present computer less then 15 days prior to the current execution. If more then 15 days have elapsed, a switch to review all files is set at step 250. However, if the program has reviewed the contents of the computer within the last 15 days, as may be indicated by the data in the registration file, a switch to review most recent files is set instead at step 255.

At step 260 a setting choice will be displayed for 20 seconds to allow the user a choice of scanning images or text files. If no choice is made, the program default of scanning both images and text file will be used.

Figure 3:
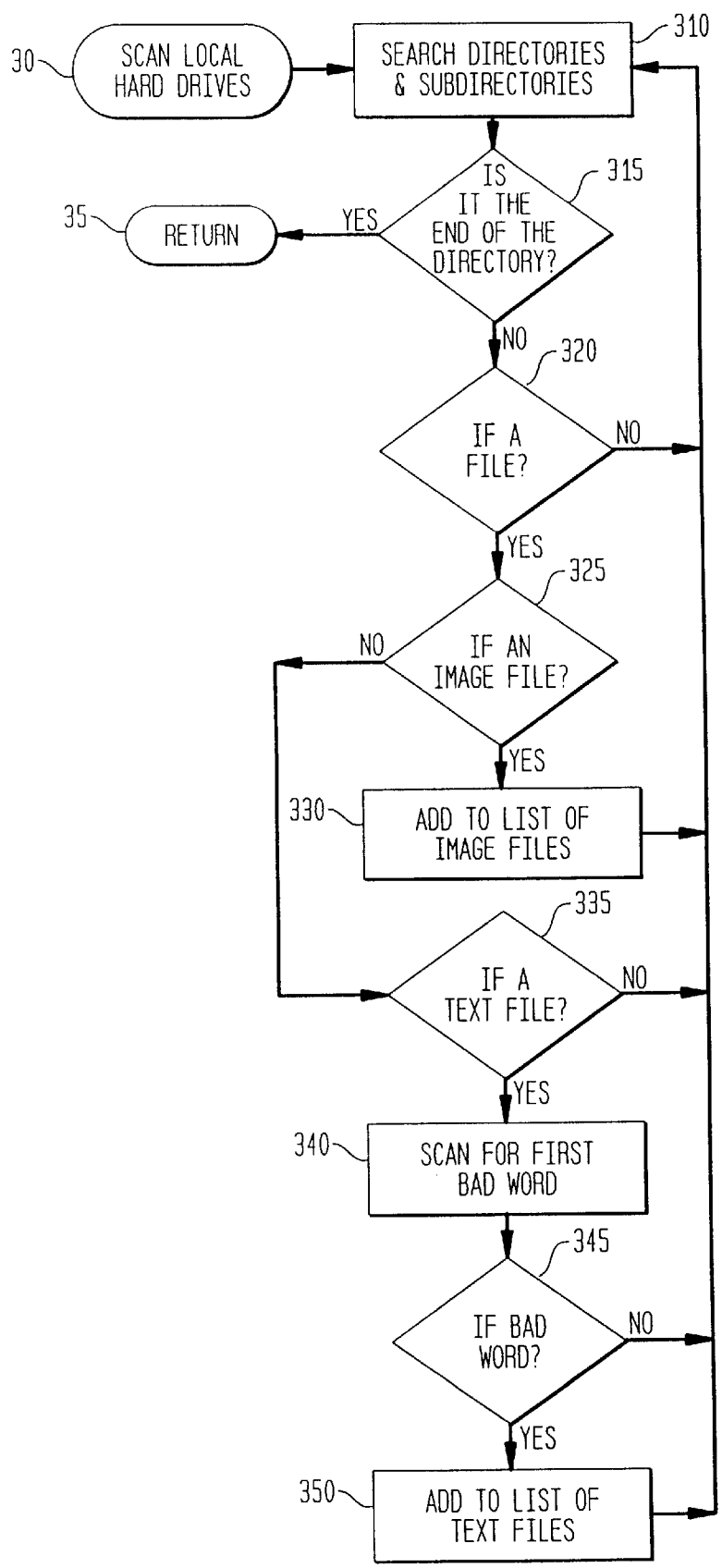
FIG. 3 is a flowchart of the logic for scanning hard drives.

The program control returns to step 30 (FIG. 1) where all local hard disk drives are scanned for images and/or text files as shown in FIG. 3. First, at step 310 all directories and subdirectories are searched. At step 315 a decision is made whether all directories have been scanned. If all directories have been scanned the control of the program returns to step 35 (FIG. 1). However if more directories remain to be scanned, at step 320 a determination is made whether the item being currently scanned is a file. If it is not the control of the program returns to step 310, and another item is read.

If the scanned item is a file, step 325 determines if it is an image file, and if it is an image file step 330 adds the item to the list of image files and the control returns to step 310, where another item is read.

If step 325 determined that the scanned item is not an image file step 335 determines if it is a text file. If the scanned item is not a text file then the control of the process returns to step 310, where another file is read. However, if the scanned item is a text file, step 340 starts scanning for the first flagged word.

A test at step 350 determines whether any suspect text was found. If the suspect text was found, the file is added to a list of text files after which, or in the case where the suspect text was not found, the control of the process returns to step 310, where another item is read. At step 35 (FIG. 1) a scan of similar logic is performed for all deleted files that have not yet been overwritten.

FIGS. 7 shows a user interface screen 700, which a user will see on the computer screen after all files are scanned and sorted. That interface screen 700 is comprised of an area 710 for image display, area 715 where a complete explanation of computer keyboard and computer mouse moves is made to inform the user of available options. The disk location of the file being viewed, the number of the file being viewed and the total number of files available for viewing is displayed in area 720.

The back and forward arrows 725, 730 are displayed to enable the user to cycle through the files available for viewing when a user clicks on a displayed button with a computer mouse or presses. The erase button 735 allows the user to delete the file currently on display, and the stop button 740 enables the user to terminate the application. The same functions are achieved through a computer keyboard when the user presses F for forward, B for back, E for erase, S to stop the program and W for words 745.

The words button 745 switches from displaying the user interface screen 700 to displaying a text interface screen 800, as shown in FIG. 8. The interface screen 800 is comprised of an area 810 for display of text files, includes HTML page files that may contain offensive words 805. Similar to area 715 (FIG. 7), area 815 contains a complete explanation of computer keyboard and computer mouse moves. The disk location of the file being viewed, the number of the file being viewed and the total number of files available for viewing is displayed in area 820.

The back and forward arrows 825, 830 are displayed to enable the user to cycle through the files available for viewing. Because, each file may contain multiple words whose offensiveness may only be determined in context, a next word button 850 allows the display of a next offensive word 805 in the same file, until the last offensive word is displayed. By double clicking on the offensive word 805, a definition of that word from the predefined listing of offensive words will be displayed to the user. A representative sample list of predefined offensive words is presented in Table 1.

TABLE 1

| | |
|---|---|
| CABRON | BASTARD |
| CABRONA | BASTARD |
| CALL GIRL | PROSTITUTE |
| CALLGIRL | PROSTITUTE |
| CAN WE MEET SOMEWHERE | TERM PEDOPHILES MAY USE |
| CANIBUS | MARIJUANA |
| CANNIBUS | MARIJUANA |
| CARAJO | DAMN |
| CAT TRANQUILIZER | THE DRUG KETAMINE |
| CELTIC CROSS | COMMON SYMBOL TO MANY RACIST ORGANIZATIONS |
| CESS | MARIJUANA |
| CHAMPAGNE | ALCOHOLIC BEVERAGE |
| CHANDOO | OPIUM |
| CHEEBA | MARIJUANA |
| CHIBA | MARIJUANA |
| CHICKEN DINNER | SLANG FOR PEDOPHILE |
| CHICKEN EATER | SLANG FOR PEDOPHILE |

The erase button 835 allows the user to delete the file currently on display, the stop button 840 enables the user to terminate the application and the pictures button 845 switches from displaying the user interface screen 800 to displaying the user interface screen 700 shown in FIG. 7.

The same functionality may be achieved by using a computer keyboard, by pressing F for forward, B for back, N for next, E for erase, S to stop the program, P for pictures and D for the double click to view the offensive word definition.

Figure 4:
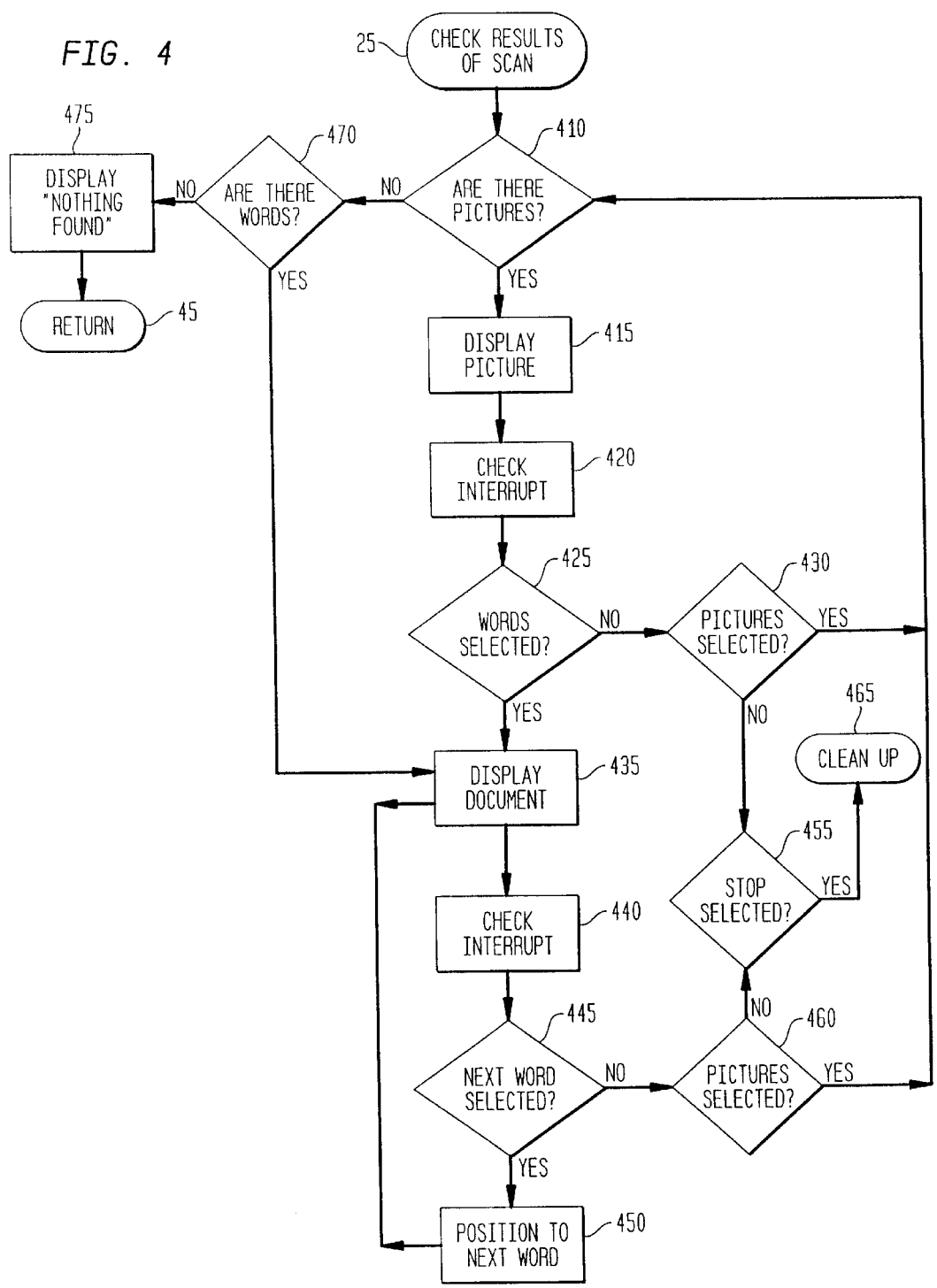
FIG. 4 is a flowchart for displaying the results of image and text scan.

FIG. 4 shows the processing steps resulting from scanned data being displayed to the user at step 40 (FIG. 1). First at step 410 it is determined whether images are to be displayed. If images are to be displayed, then at step 415 a current image is displayed, after which the interrupt is checked at step 420 to see if the user has provided any input.

At step 425 a check is made to determine whether text was selected, if not then at step 430 a check is made to determine whether stop was selected. If stop was not selected, then processing continues at step 410 where a next image is displayed if it exists. If stop was selected then a termination cleanup module is invoked at step 465.

If at step 425 it is determined that the text was selected by the user, then a document from a list of documents containing the suspect text will be displayed at step 435. At step 440 an interrupt is checked to see if the user has provided new input.

At step 445 a check is made to determine whether the next suspect word in the text was selected, if not then at step 460 a check is made to determine whether images were selected. If image were selected, the process then continues at step 410 where an image is displayed if it exists. If the image was not selected, then a check is made at step 455 to determine whether the user has selected stop. If stop was selected then a termination cleanup module is executed at step 465. If stop was not selected that implies that the user has not provided any input, in which case the program will wait until input is provided or the computer is turned off.

Returning now to step 410, if it is determined that no images were found on the computer, at step 470 a determination is made whether files having suspect text were found on the computer. If there are files with the suspect text, processing will commence at step 435. If no files with suspect text were found, at step 475 "nothing found" will be displayed on the screen and the processing will return to step 45 (FIG. 1) where the program will invoke the termination and cleanup module an terminate itself.

Figure 5:
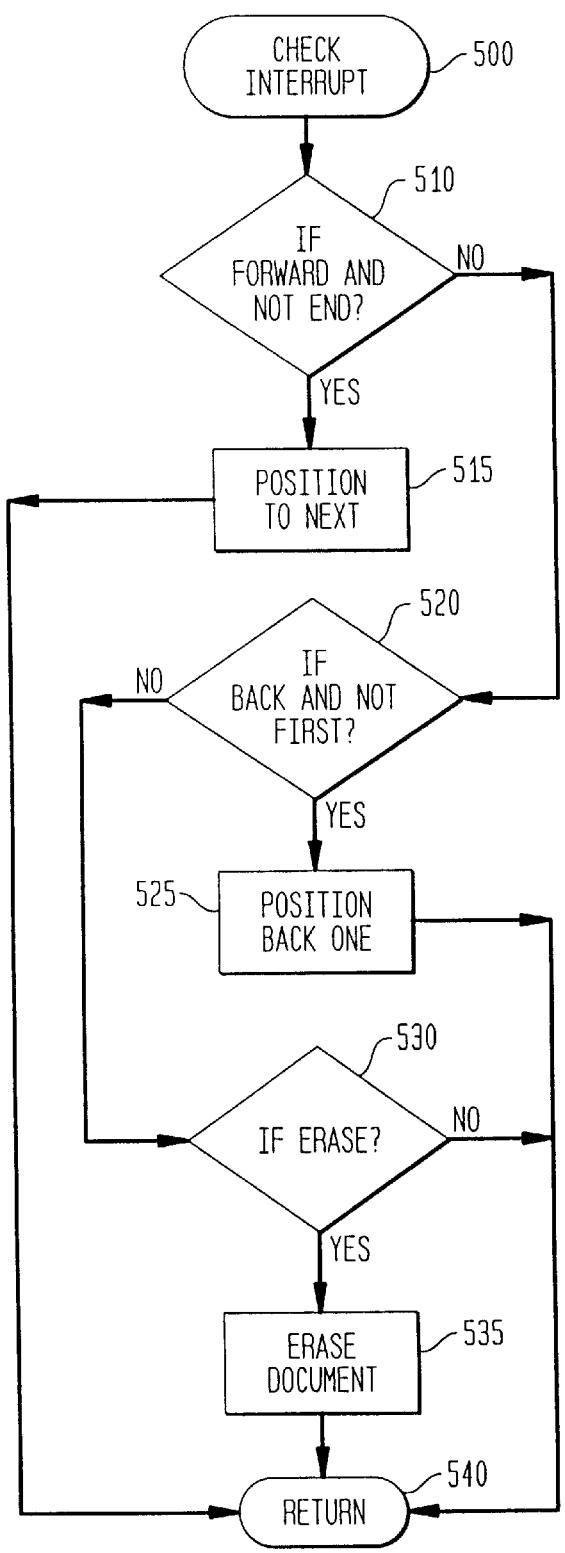
FIG. 5 is a flowchart of the check interrupt logic.

Turning now to the check interrupt routine shown in FIG. 5. After receiving a call, at step 500, from the display results routine shown in FIG. 4, the check interrupt routine checks at step 510 whether the "forward" button was pressed. If it was, then at step 515 a counter incremented to point to the next file, and the control of the program is returned to the calling routine at step 540.

If the "forward" button was not pressed, at step 520 a check is made whether the "back" button was pressed. If it was, then at step 525 a counter is decremented to point to the previous file, and the control of the program is returned to the calling routine at step 540.

If the "back" button was not pressed, at step 530 a check is made whether the "erase" button was pressed. If it was, then at step 535 the pointed to document is deleted. The control of the program is returned to the calling routine at step 540.

Figure 6:
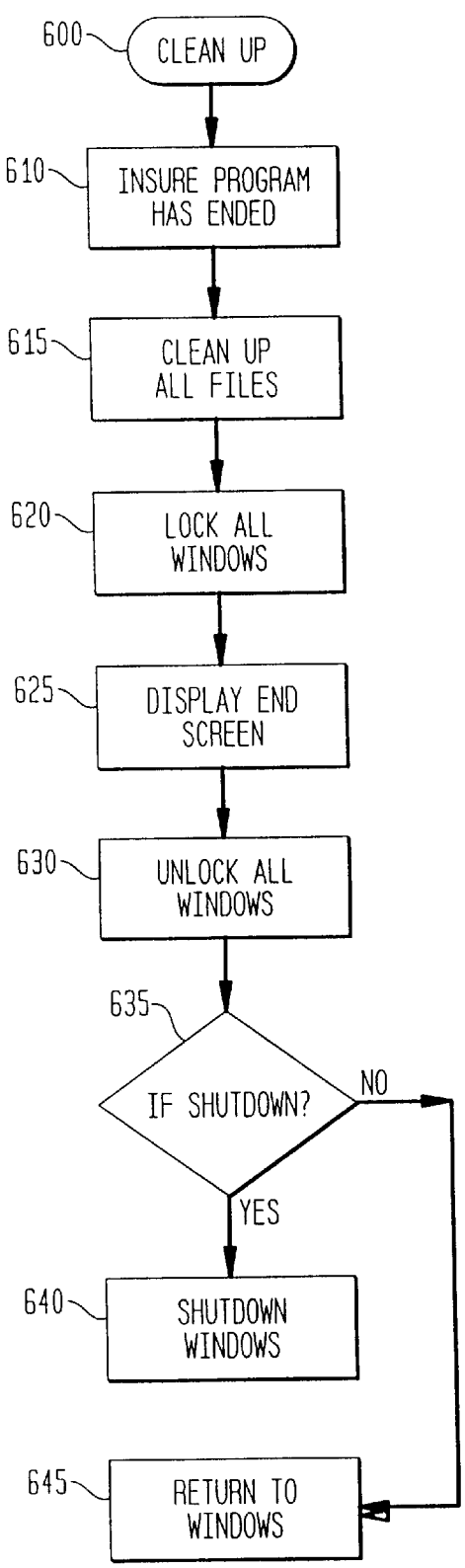
FIG. 6 is a flowchart of the program end and self delete logic.

The termination and cleanup routine called from step 465 (FIG. 4) is shown in FIG. 6. After receiving the call at step 600, the cleanup routine, at step 610 insures that the processing of the program of the present invention has terminated. This is followed at step 615 by cleanup of all log and temporary files created during the execution of the program. Steps 629–630 display to the user a confirmation that the inventive program has terminated, and according to the user's wishes steps 635–645 to either shutdown the operating system or return control to the operating system.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. An investigating method of performing an interactive review of the contents of computer files stored on a personal computer, said interactive review enabled with minimal user involvement and minimal technical knowledge, said method comprising steps of:

a. instantiating an investigative computer program in said personal computer from a removable disk;

b. displaying a dialogue window on a computer screen for enabling said interactive review;

c. defining a list of words to be flagged as suspect;

d. scanning each file stored on said personal computer and compiling a list of image files and a list of text files containing words flagged as suspect;

e. sequentially displaying image files and text files having said words flagged as suspect in said dialogue window; and f. terminating said investigative computer program and removing said removable disk from said personal computer.

2. The method of claim 1, wherein an operating system of said personal computer includes a registry file and said method further comprises the step of entering runtime date in said registry for further reference.

3. The method of claim 2, wherein step (c) further comprising steps of:

determining from said registry file whether said interactive review was performed on said personal computer prior to a predetermined date; and scanning only said files which were created after said predetermined date.

4. The method of claim 3, wherein step (c) further includes the step of displaying the progress of said scan in said dialogue window.

5. The method of claim 4, wherein step (d) further includes the step of enabling the user to input a choice of
(i) displaying said image files,
(ii) displaying said text files, or
(iii) terminating processing.

6. The method of claim 5, wherein step (d) further comprises accepting user input choice on display of a next image file, a next text file and a next word flagged as suspect in said text file.

7. The method of claim 6, wherein step (d) further comprises displaying upon user request a definition from said list of words for each of said words flagged as suspect.

8. The method of claim 7, further comprising a step for allowing said user to delete files.

9. The method of claim 5, wherein step (d) comprises the following steps:

d1. setting user request to image display;

d2. displaying next image file, if said image file list is not empty and said user request is image display;

d3. displaying next suspect word in said text files, if said text file list is not empty and said user request is text file display;

d4. determining whether said user has requested a different action in said dialogue window; and d5. performing cleanup of log and temporary files and terminating processing, if said image file list and said text file list are both empty or if said user requested program termination.

10. A computer program device readable by a machine, tangibly embodying a program of instructions executable by a machine to perform investigating method steps of performing an interactive review of the contents of computer files stored on a personal computer, said interactive review enabled with minimal user involvement and minimal technical knowledge, said method comprising steps of:

a. instantiating an investigative computer program in said personal computer from a removable disk;

b. displaying a dialogue window on a computer screen for enabling said interactive review;

c. defining a list of words to be flagged as suspect;

d. scanning each file stored on said personal computer and compiling a list of image files and a list of text files containing words flagged as suspect;

e. sequentially displaying image files and text files having said words flagged as suspect in said dialogue window; and f. terminating said investigative computer program and removing said removable disk from said personal computer.

11. The method of claim 10, wherein an operating system of said personal computer includes a registry file and said method further comprises the step of entering runtime date in said registry for further reference.

12. The method of claim 11, wherein step (c) further comprising steps of:

determining from said registry file whether said interactive review was performed on said personal computer prior to a predetermined date; and scanning only said files which were created after said predetermined date.

13. The method of claim 12, wherein step (c) further includes the step of displaying the progress of said scan in said dialogue window.

14. The method of claim 13, wherein step (d) further includes the step of enabling the user to input a choice of
(i) displaying said image files,
(ii) displaying said text files, or
(iii) terminating processing.

15. The method of claim 14, wherein step (d) further comprises accepting user input choice on display of a next image file, a next text file and a next word flagged as suspect in said text file.

16. The method of claim 15, wherein step (d) further comprises displaying upon user request a definition from said list of words for each of said words flagged as suspect.

17. The method of claim 16, further comprising a step for allowing said user to delete files.

18. The method of claim 17, wherein step (d) comprises the following steps:

d1. setting user request to image display;

d2. displaying next image file, if said image file list is not empty and said user request is image display;

d3. displaying next suspect word in said text files, if said text file list is not empty and said user request is text file display;

d4. determining whether said user has requested a different action in said dialogue window; and d5. performing cleanup of log and temporary files and terminating processing, if said image file list and said text file list are both empty or if said user requested program termination.

19. The method of claim 1, further comprising the step of eliminating temporary files created on a non-removable disk during a runtime of said investigating method.

20. The method of claim 1, wherein said investigating method is conducted for determining exposure at said computer to image files and text files having suspect words in a substantially undetectable manner.

21. The method of claim 10, further comprising the step of eliminating temporary files created one a non-removable disk during a runtime of said investigating method.

22. The method of claim 10, wherein said investigating method is conducted for determining exposure at said computer to image files and text files having suspect words in a substantially undetectable manner.

* * * * *